Figure 1:
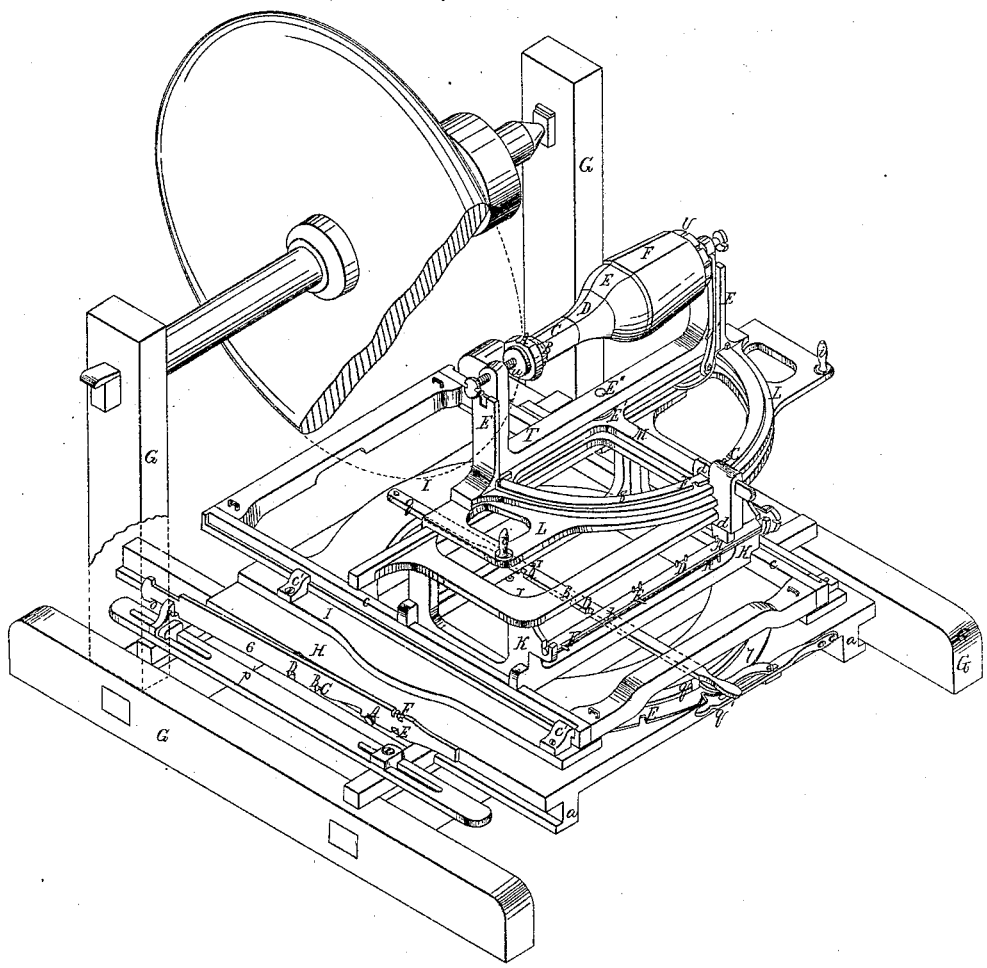

J. P. COLNE.
MACHINE FOR CUTTING GLASS.
No. 8,323. Patented Aug. 26, 1851.
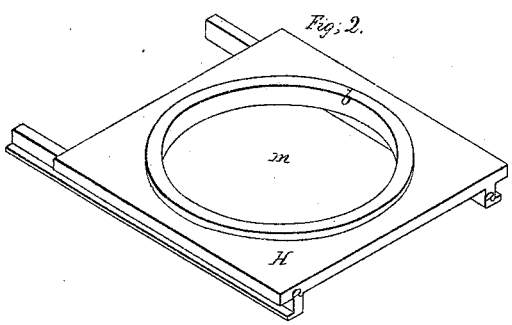
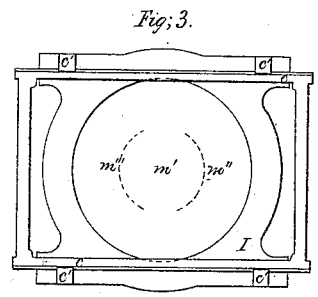
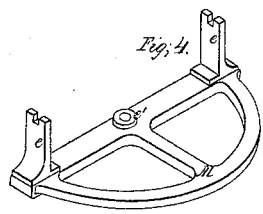
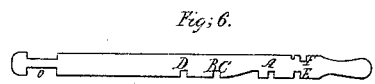
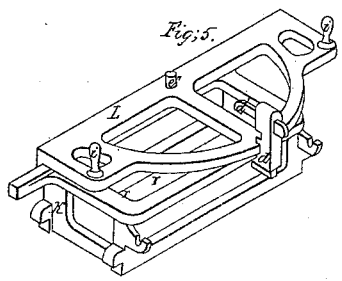
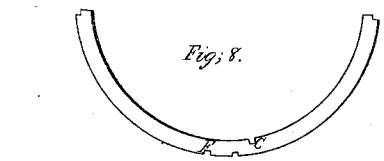
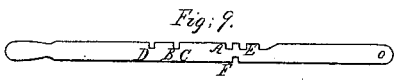

2 Sheets—Sheet 1.

J. P. COLNE.
MACHINE FOR CUTTING GLASS.

No. 8,323. Patented Aug. 26, 1851.

UNITED STATES PATENT OFFICE.

JOHN P. COLNÉ, OF NEW YORK, N. Y.

MACHINERY FOR CUTTING GLASS.

Specification of Letters Patent No. 8,323, dated August 26, 1851.

*To all whom it may concern:*

Be it known that I, JOHN PETER COLNÉ, of the city, county, and State of New York, have invented a new and useful Improvement in Glass-Cutting Machinery; and I do hereby declare that the following is a full, clear, and exact description of the same, reference being made to the annexed drawing, making a part of this specification, in which—

Figure I is a perspective view Figs. II, III, IV, V, VI, VII, VIII, and IX are parts in detail.

Similar letters refer to similar parts throughout.

My invention relates to an improvement in glass cutting machinery, and is also applicable to the cutting and shaping of crystals, stones, gems and all articles which are shaped by grinding with gritty substances.

In the following description the cutting of glass will be taken as the material for illustration and description. At present the only mode by which decanters, tumblers, vases, &c., are cut is by the hand of the operator, unaided by any guide or mechanism, bringing the article against the edge of the stone and in the direction suitable for producing the intended form and pattern. Hence the eye is the only mode of determining as to the correctness of the proportions produced, and often-times pieces are spoiled from the slightest variation of the position of the operator's hand so that years are often consumed in learning to be a good glass cutter. By my invention the pieces are so guided and adjusted in a frame that all the movements for executing curves, concaves, fillets, &c., are produced by exact measurements and an error of any consequence is impossible. The art of working the machine may be learned by ordinary hands; while much greater speed in the execution of the work is also attained.

The representation in the drawings is of the act of cutting the outside surface of a glass decanter from the smooth cylindrical shape in which it was blown or formed, into a polygonal figure, as an octagon, &c. In a straight sided subject this would be effected by simply passing it along the edge of the wheel from top to bottom until a strip or flat surface was cut to the depth required; the surface would be however slightly concave, greater or less according to the diameter of the cutting wheel. In the case of the decanter, its outline figure from top to bottom is not straight, but usually consists of a series of curves, concaves, and conical forms, and therefore the polygonal figure must be traced over these curves.

The decanter to be ornamented is suspended horizontally in the machine so that it can revolve exactly on its centers and be moved in the several directions required for the purposes intended. At G is the frame supporting the machine. Upon this there is a bed plate H having slides (*a*, *a*) on its underside by which it is kept on the frame but can play back and forth on the grooves of (*a*). A large opening is made in the plate and a circular rail (*b*) Fig. II formed on its edge. A second plate I formed substantially as shown in Fig. III is laid down upon the bed H; on the underside of I a groove or ring is formed so as to fit accurately around the inside surface of the rail (*b*) thus while it is kept firmly in place it can be turned around in the same manner as if it revolved upon a center, while it is at the same time carried back and forth by the bed plate. Upon the plate I there is a movable railway or frame (*c*) which constitutes in fact part of the plate and has a limited movement on that. It is kept in place by the studs (*c'*) or other similar device. The object of having these rails movable is for the purpose of causing the plate thus formed to occupy less length than it would were the rails attached permanently to the plate I, because the carriage which slides upon them is not required always to go the whole length, but is to be moved back and forth more or less according to the size of the object operated upon by the machine; therefore when the carriage upon it is to be drawn forward to the full extent, the rails are drawn out with it for the purpose of affording it support.

The carriage consists principally of three pieces; first a frame K forming a sort of table, the lower part of which rests upon the railway (*c*) and is kept in place by proper guide pieces. The second piece L lies upon the top of the frame K. The two rails forming the back and front sides of the top part of K are made exactly parallel on their outer edges, and by these edges the piece L which is a semicircular plate, is kept in place by means of a straight edge on the back and a hook (*d'*) on the front. The plate is permitted to slide back and forth parallel to these edges. The third piece is a semicircular plate M having two upright posts (e) at the angles formed by the junction of the circular edge with the straight edge. These uprights are for the purpose of steadying the crank or frame holding the object to be shaped; or the center points may be inserted directly in the top of these posts.

In the centers there is a hole (e') Fig. IV by which the plate is kept in place upon L by the pin (e''); thus it has a circular motion on this pin and also a sliding motion given by the plate L. By means of the various movements of the parts which have been thus far described, either separately or in combination, curves, and parallel lines may be cut upon any object suitable for the machine. Suppose that the center (e') of the plate M and centers of the plates H and I are brought to coincide; then if the rounded edge of the cutting stone were made to bear against the side of the decanter by moving the bed plate H along on its slides (a) it would make a cut tending to sever the decanter, but a proper stop being fixed to arrest its motion as soon as the cut was deep enough the whole would then be in a proper position to make a straight cut along the side from end to end. This would be accomplished by taking hold of the two handles (i i) on the plate L and sliding it along across the frame K, thereby carrying the decanter along at right angles to the edge of the stone. If instead of a parallel line, an angular one is to be cut to suit the tapering shape of the lower part of the decanter as seen at F marked thereon, then the plate M must be turned upon its center (e') by which the central line or axis of the decanter is changed from a right angle to the cutting stone to an obtuse angle. The movement of the plate L or the carriage K is the same as before, that is, parallel to the axis of the cutting instrument; the line of the decanter at the part F is also brought to the same angle and therefore in passing across the edge of the stone the tapering cut is given. Concaves and convexes are obtained by sliding the carriage so that the center (e') shall be no longer co-incident with the center of the bed plate H. Let it be supposed that the center of the bed plate H is at (m) Fig. II and the center of the plate I co-incident therewith as at (m') Fig. III. The center (e') is now moved by sliding the carriage K on the rail-way (c) until it is brought to stand over the point (m'') Fig. III; the side of the decanter is now brought against the edge of the cutting stone by sliding the bed plate H along, which carries the whole of the other parts with it, then by partially revolving the plate I the concave shown in the dotted lines in Fig. III will be cut upon the decanter according to the radius (m', m''). A convex is produced by carrying the center (e') to the opposite side (m''').

The exact position of the several plates, and of the carriage, and the extent of the movements allowed for certain shapes are all determined by a system of gages and stops which are prepared and applied in order to the formation of some previously determined pattern. Figs. VI, VII, VIII, IX are plans of pieces which are applied to the various parts of the machine for adjusting the distances, the set, and the extent of movement of the several parts. These all apply to the production of some particular figure, so that when another figure or pattern is to be produced these are removed and another set introduced prepared accordingly.

Fig. VI is a piece which is attached to the bed plate H (as at 6) and part of the framing G. The object of this piece is to set the place of the bed plate, and regulate the distance it can slide. This latter is determined by the notch (o) which rests upon a stop (p) Fig. I which is attached to a regulating bar (p'). (It should be remarked that the cutting stone must be hung so that its center is on a line with the center of the bed plate.) The notches A, B, C, &c., in the edge of the gage Fig. VI represent the different positions of the center of the bed plate in cutting curves.

Fig. IX is the pattern for determining the radius for forming the curves, one end (q) is fixed to the plate I and in the middle of the cross framing of the carriage K, are pins (r) to fit the notches in the pattern. Part of these notches lie on one side of the center and part on the other, if both concaves and convexes are to be cut. A curved piece Fig. VII is laid in front of the bed plate (seen at 7) and under the edge of the plate I. A stop (q) on the latter plays along the inner edge, and a spring clutch (q') outside sets the pattern to the right or left; the object of this piece is to determine the extent of rotary movement the plate I shall have in cutting curves. A pattern Fig. VIII is laid upon the semicircular plate M (as at 8) to determine the angle the axis of the decanter or other objects to be cut shall have to the axis of the cutting instrument, when straight lines are to be formed at various angles. A pattern (t) is attached to the frame K to determine and keep in position the plate L in cutting certain parts and also to determine the extent of its sliding movement when that movement is to be used. It is formed by placing in a cylinder a number of pins at different positions; these pins act upon a stop (d) fixed to the plate L. When the plate L is to be kept in one exact position they are placed so close together that the stop (d) will barely pass between them. When the plate L is to have a sliding movement, then the pins are placed as far apart as that movement is to be carried, as seen at the part F. A small stop wheel and pawl are seen at the end to hold the cylinder in place after is has been set.

For convenience of centering the piece to be ground or cut, a cranked piece T is formed to fit between the uprights (e). The two centers are screwed in its ends and press against two plates (u, v). By screwing up the center pins the decanter is pressed by the plates and firmly held. The exact centers of the decanter may be found by revolving it and marking its inequalities, or by putting it in a centering machine. The edge of the plate (v) is divided into a series of notches representing the number of faces or sides which are to be cut upon the decanter; the point of a pawl (v') presses into one of the notches and prevents the decanter from revolving until a complete cut has been made. It is then shifted to the next notch and so on until the article is finished. This insures great accuracy in the figure; whereas in the old mode by hand where the eye is the only guide more or less inaccuracy is always found, no two sides measuring exactly alike.

The operation is then as follows: The decanter has been properly centered and put upon the machine. The bed plate H is next moved so as to bring the notch A upon the pin as shown. This carries the center of the bed plate a little under the edge of the cutting wheel. The carriage K is next moved forward until the pin (r) is lodged within the notch A on the gage rod (9) attached to the plate I. These two movements set the decanter at the proper distance for the edge of the cutting wheel to act upon its lip or mouth piece, as shown at the letter A on it. The axis of the decanter is set at right angles to the wheel by setting the semi-circular plate M to the middle notch in the gage (8) between F, C. The plate L is then moved along so as to engage the stop (d) within the pins A on (t). These pins are set sufficiently far apart to allow of a short sliding movement of the plate L. The plate I is also brought around so that the stop (q) is brought against the stop (q'). All the parts of the machine are now set to take the first cut from the decanter. The plate H will now be moved so as to carry the decanter toward the edge of the stone, and the lip or mouth piece A will come against it. The operator will take hold of the handles (i) and move the plate L to the right or left as far as permitted by the play of the stop (d) between the pins A on (t). This play is sufficient to pass the lip of the decanter across the edge of the stone when it will be gradually cut away, the pressure of the operator feeding by the gradual movement of the bed plate H until it can go no farther being prevented by the stop (p) in the notch (o) and thus one side of the polygon will be formed. Now by turning the decanter on its axis to the next notch in (v) another side will be presented to be cut and so on until that part is completed. A set of shifting movements must now be made to cut the concave forming the neck under the mouth piece. Set all the gages, stops, &c., to the notches indicated by the letter B, that part of the decanter will be brought against the edge of the stone, and the cutting effected by pressing the decanter against its edge and revolving the plate I as far as permitted by the stop (q) sliding along the gage (7). C, D, E, F, are produced by setting the pattern gages to the letters or mark indicated for the figure. When the machine is set according to any particular mark on the several gages named, the movements it is permitted to have are only those for the production of the desired figure and hence a mistake is rendered impossible. The work may be commenced anywhere beginning on the end or at the middle, and when the whole is completed it will exhibit a correct figure; or part of the work may be done in one machine set to cut a particular curve, and the subject thence transferred to another machine set in like manner for another, and so on. This arrangement may be advantageous when large quantities of the same pattern are to be produced.

What I claim as of my invention and desire to secure by Letters Patent of the United States is—

1. The combination and arrangement of the several parts for giving the reciprocating and circular movements herein described, that is to say—the combination of the bed plate H and revolving plate I with the carriage, consisting of the pieces K, L, M.

2. The method of guiding the movements and adjusting the several parts of the machine for the purpose of directing the course of the object to be shaped or figured in passing the edge of the cutting wheel, by means of movable lettered or named stops, and gages, prepared for particular patterns, and applied to the machine as required the whole being constructed and operating substantially as herein set forth.

J. P. COLNÉ.

Witnesses:
S. H. MAYNARD,
JOHN W. KILSBY, Jr.